Inventor
J. Bell

INVENTOR
JOHN BELL

United States Patent Office 2,901,996
Patented Sept. 1, 1959

2,901,996
CONTROL APPARATUS FOR THE STABILIZATION OF SHIPS

John Bell, Beckenham, England, assignor to Muirhead & Co. Limited, Beckenham, England Application August 17, 1953, Serial No. 374,666
Claims priority, application Great Britain August 26, 1952

2 Claims. (Cl. 114—122)

This invention relates to the stabilization of ships against pitching and refers particularly to the functions used in the control of the stabilizing means.

The natural undisturbed rolling or pitching motions of a ship are simple harmonic motions but in a given ship the periodic times of roll and pitch are different. If a disturbing force is applied to a ship to cause it to roll or pitch and the force is then removed the ship will continue to oscillate according to the harmonic law with decreasing amplitude and will eventually settle in its original vertical position.

The roll or pitch of a ship differ fundamentally from the yaw of a ship or the roll, pitch or yaw of an aircraft, since the latter movements are all of a completely random nature. A ship which is rolling or pitching will, upon reaching the limit of its movement in one direction, of its own accord accelerate towards its central or datum position, passing through the datum position with maximum velocity, and will then decelerate until its velocity falls to zero at the other extreme of its movement. In the case of the yaw of a ship or the roll, pitch or yaw of an aircraft, the craft accelerates away from its datum position and has little or no tendency to return to that position.

The invention is applicable only to damping the rolling or pitching motion of a ship; it is not applicable to correcting yaw in a ship or roll, pitch or yaw in an aircraft. Its principal object is to provide a more precise control of the stabilizing or roll damping means than has been available hitherto. It is applicable to stabilization against both roll and pitch but for the sake of clarity it is described in relation to roll only.

It is recognized in the art that where the motion is purely harmonic the most effective damping is provided by a control responsive to roll velocity, that is, sensing means responsive to roll velocity are employed to provide the signals which control the stabilizing means. There is, however, an inherent small time lag before the sensing means can provide a signal and a very much larger time lag whilst the heavy stabilizing means are moved into their appropriate positions to counter the roll. Consequently the stabilizing effort is always applied late.

It is known (in British Patent No. 581,776) to advance the control signal in time, in order to offset the time lag. The method is based on the fact that where the motion of the ship is purely harmonic the signal delivered by the velocity sensing means is sinusoidal in character and signals corresponding to angular displacement or roll acceleration are also sinusoidal but in each case removed in phase by 90°. The addition of two sine waves produces a third sine wave and if a signal corresponding to angular displacement or roll acceleration is added to the velocity signal in the correct sense, then the resultant signal is also sinusoidal but advanced in time phase with respect to the velocity signal. Thus by applying an anticipatory signal of appropriate magnitude the time lags in the sensing means and the stabilizing means are offset.

In the practical case the natural harmonic motion of a ship is disturbed, to a greater or lesser extent, by random movements. Thus under conditions of heavy rolling, with little wind or wave motion, the roll may approximate very closely to the true harmonic motion, whereas under conditions of light rolling with relatively high wind and considerable wave motion the roll of the ship may differ considerably from its natural characteristic although the periodic time will still tend towards the natural periodic time of the ship. It is only possible to anticipate the future position of a body if its movement follows a known law; consequently, the anticipation signal referred to above becomes progressively less effective as the motion departs more widely from the harmonic characteristic.

Accordingly, another object of the invention is to analyse the motion of the ship to determine the extent to which it departs from its natural character and to vary the control signal accordingly.

The invention will be further described with reference to the accompanying drawings.

Figure 1:
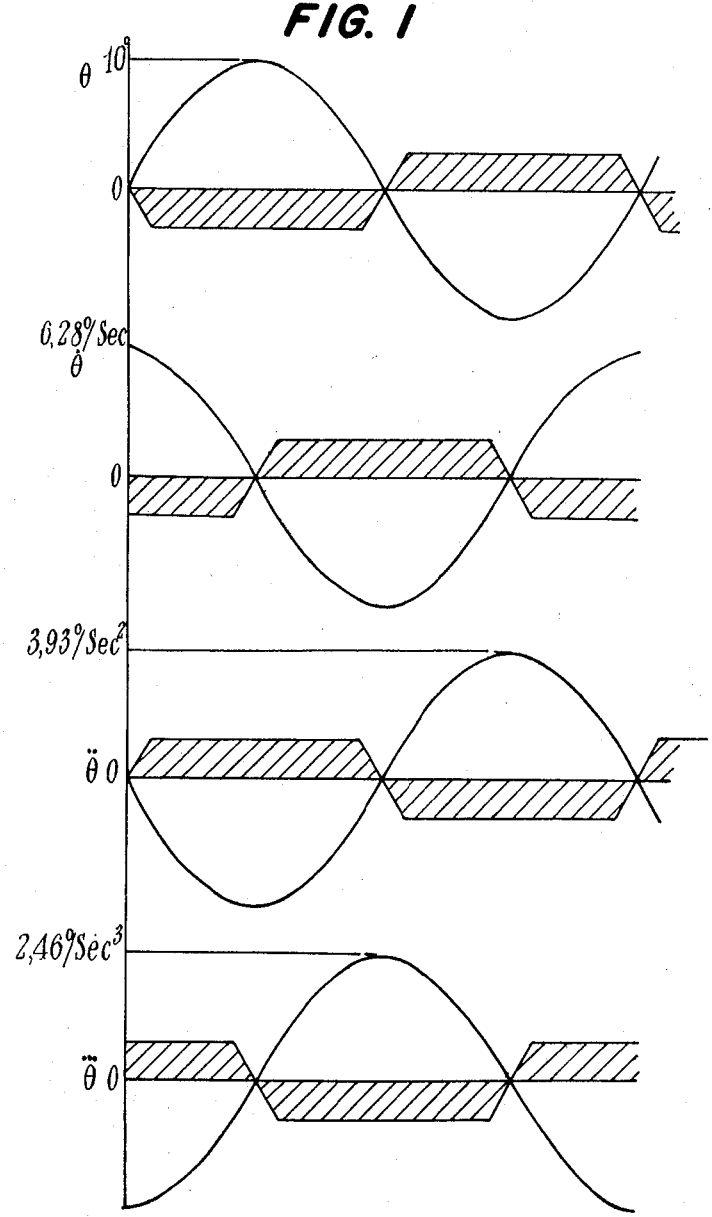
Figure 1 is a series of curves showing the roll and its derivatives.

Referring to Figure 1 the top diagram shows a curve of simple harmonic motion of a ship $\theta$ against a base of time. This is a sine curve. The shaded areas represent the idealised derived fin movements to oppose this function of motion of the ship. The second diagram shows a curve of velocity $\dot{\theta}$ which is also a sine curve. It is the first differential with respect to time of curve $\theta$ and is displaced from it by 90°. The third diagram shows a curve of acceleration $\ddot{\theta}$. This is also a sine curve; it is the second differential with respect to time of curve $\theta$ and is displaced from it by 180°. The fourth diagram shows a curve of rate of change of acceleration $\dddot{\theta}$ which is also a sine curve, being the third differential with respect to time of curve $\theta$ and displaced from it by 270°. The curves are drawn to ordinate scales chosen to present the curves as having the same amplitude and with each is shown the appropriate derived fin motion.

It will be clear that curves $\theta$ and $\ddot{\theta}$ are identical but displaced by 180°, that is to say they are in anti-phase. The same is true of curves $\dot{\theta}$ and $\dddot{\theta}$.

According to, one method of carrying out the invention signals corresponding to $\theta$ and $\ddot{\theta}$ are obtained from sensing means, the said means being arranged so that the amplitudes of the signals are exactly the same when the movement is truly harmonic. The signals are placed in opposition and thus cancel out and provide no resultant signal. When the motion departs from the harmonic characteristic the two signals are no longer identical and a difference signal appears, which is a measure of this departure.

In an alternative method signals corresponding to $\dot{\theta}$ and $\dddot{\theta}$ are employed in exactly the same way.

Preferably the difference signal obtained from the control means according to the invention is added to or combined with a further control signal such as a velocity signal or a velocity signal with anticipation as already mentioned.

Figure 2:
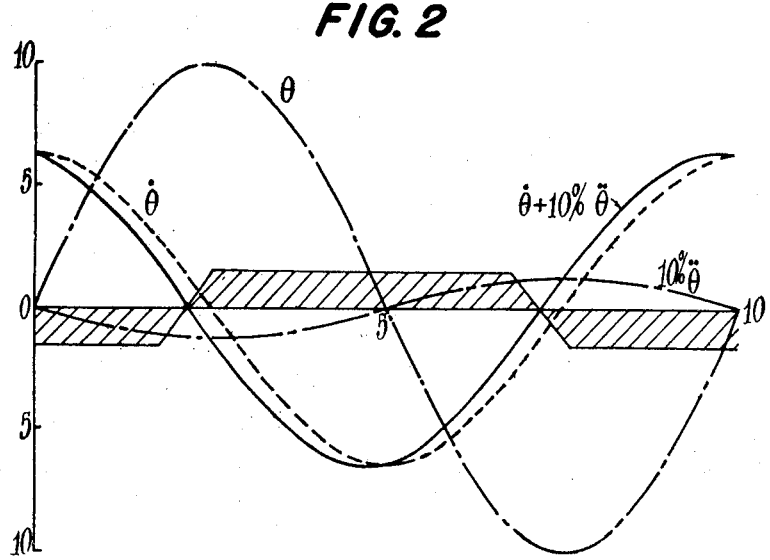
Figure 2 is a further series of curves showing the addition of 10% acceleration to a velocity signal for the purpose of giving anticipation.

Figure 2 shows how, in the case of harmonic motion, a velocity signal may be advanced in time phase by a desired amount without altering its character, in order to offset the time lag due to the stabilizing means. Curve $\theta$ represents the displacement of the ship and is a sine curve. The curve labelled "10% $\ddot{\theta}$" represents acceleration and is also a sine curve but is 180° displaced from $\theta$, i.e. it is in anti-phase. Its amplitude is 10% of that of $\theta$. Curve $\dot{\theta}$ represents velocity and is displaced by 90° from $\theta$. The full line curve labelled "$\dot{\theta}+10\%\ \ddot{\theta}$" is the sum of these two curves and shows that the character of the velocity curve is not changed but its time phase is advanced.

Figure 3:
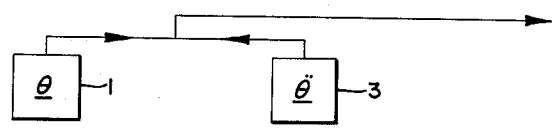
Figure 3 is a block diagram of a basic arrangement of the invention.

Figure 3 is a diagram showing the invention in its basic form. Block 1 represents sensing means adapted to deliver a signal corresponding to roll angle $\theta$. Similarly block 3 represents sensing means adapted to deliver a signal corresponding to roll acceleration $\ddot{\theta}$. The signals are placed in opposition and so adjusted so that when the motion is a simple harmonic motion they are of equal magnitude and cancel. It will be understood that simple harmonic motion can only occur at the natural frequency or periodic time of the ship so that the signals are of necessity adjusted to cancel at the ship's natural frequency. Once the adjustment is made the signals will cancel for simple harmonic motion of any amplitude and at all times, irrespective of the instantaneous velocity, or the direction in which the ship is moving, i.e. either away from or towards its upright datum position.

Figure 4:
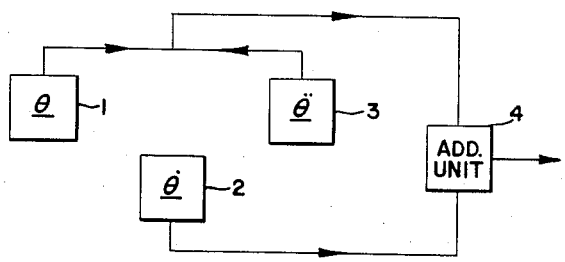
Figure 4 is a block diagram of an arrangement including a velocity control.

Figure 4 shows, also in diagrammatic form, how the difference signal of Figure 3 may be combined with a simple velocity control. Sensing means 1 and 3 are provided, as before. Sensing means adapted to produce a signal corresponding to roll velocity and represented by block 2 are added. The difference signal from 1 and 3, and the signal from 2, are applied to adding unit 4 and the combined signal is applied to the stabilizing means as indicated by the arrow.

When the motion of the ship is purely harmonic means 1 and 3 provide no difference signal and stabilization is controlled by velocity sensitive means 2 only. Whenever the motion departs from the harmonic character a difference signal from means 1 and 3 is added in adding unit 4 in order to change the character of the stabilizer movements to meet the changed character of the roll.

Figure 5:
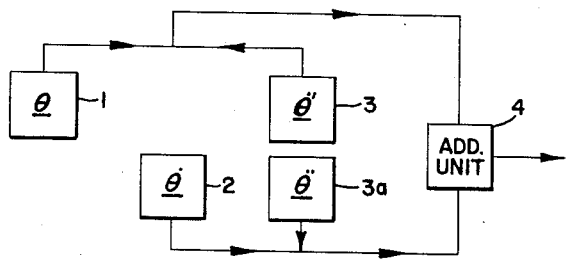
Figure 5 is a block diagram of arrangement including a velocity control with anticipation.

Figure 5 shows, also in diagrammatic form, how an anticipation signal may be added to the velocity signal of Figure 4. Sensing means 1, 2 and 3 correspond to those of Figure 4, and further sensing means 3a are added. These may consist of a second velocity sensitive unit adapted to deliver a signal corresponding to roll acceleration of such magnitude as to give the desired amount of anticipation to the velocity signal from 2.

When the motion is purely sinusoidal the signals from 1 and 3 cancel out and stabilization is controlled by the velocity signal from 2 combined with the anticipatory signal from 3a. As soon as the motion departs from the harmonic characteristic a difference signal appears from 1 and 3 and is added to the signal from 2 and 3a.

The arrangement of Figure 4 requires three sensing units and that of Figure 5 requires four. It is possible in either case to reduce the number of sensing units to two and practical embodiments corresponding to these two arrangements will now be described.

Figure 6:
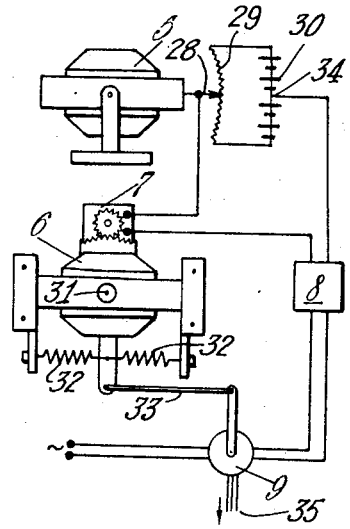
Figure 6 is a practical embodiment of the invention.

Figure 6 shows a practical arrangement corresponding to Figure 4. A free vertical-keeping or pendulous gyroscope 5 is arranged so that its spin axis is vertical. Sliding contact 28 of potentiometer 29 is coupled to the movable casing of gyroscope 5. D.C. source 30 centre-tapped at 34 provides the operating voltage for 29. A second gyroscope 6 is of well-known type having one degree of freedom only. Its spin axis is horizontal and athwartships and its casing is pivoted so that it may rotate about axis 31. When the ship rolls the spin axis of gyroscope 6 is forced to move with it and the gyroscope precesses about axis 31. Gyroscope 6 is urged to the central position by restoring springs 32. As is well known in the art the amount of precession against springs 32 is directly proportional to roll velocity and the speed of precession is directly proportional to roll acceleration. A D.C. generator 7 is suitably driven from gyroscope 6 and since its output voltage is directly proportional to rotational speed, it is also directly proportional to roll acceleration.

One terminal of 7 and contact 28 are joined and the remaining terminal of 7 and centre tap 34 are connected to the two input terminals of a magnetic or other type amplifier 8. Assuming that the ship is not rolling, then there is no voltage between 28 and 34 and no voltage is generated by 7. As soon as the ship begins to roll gyroscope 5 begins to oscillate with respect to the ship and a voltage difference is set up between 28 and 34, depending in magnitude upon the angular displacement of 5 and in polarity on the sense of the displacement. Gyroscope 6 also begins to precess and the voltage generated by 7 depends in magnitude upon the roll acceleration and in polarity upon the sense of the acceleration, i.e. either positive or negative. The polarities are such that the potentiometer and D.C. generator voltages are in opposition. The voltage gradient along 29 and the characteristics of 7 are so chosen that if the roll is purely harmonic, the two voltages are equal and opposite and no resultant voltage is applied to 8 which consequently produces no output. When the roll departs from the harmonic characteristic a difference voltage appears at the input terminals of 8.

A transmit synchro of magslip 9 is of the well-known type having two windings on its rotor, set at right angles.

In such a synchro the energising voltage is applied to one rotor winding and the magnetic field produced has its axis coincident with the axis of the said winding. If a second voltage substantially in phase with the energising voltage is applied to the second rotor winding, it sets up a second field at right-angles to the first and, by combination, produces a resultant field whose axis makes an angle with the axis of the energising winding which depends upon the relative magnitudes of the two voltages. Thus the axis of the magnetic field may be rotated by mechanically turning the rotor or it may be rotated to a limited extent by electrical means. This type of synchro provides a means of adding a mechanical movement and an electrical signal. The output signal is transmitted over the three leads 35.

The movement of gyroscope 6 is transmitted to the rotor of synchro 9 through link 33 so that in the absence of a signal from 8 the output signal from 9 is dependent only upon the position of gyroscope 6 which, in turn, depends upon roll velocity. When the roll departs from the harmonic characteristic the difference signal from 8 is added in synchro 9 and its output signal then depends on the sum of the mechanical signal over link 33 and the electrical signal from amplifier 8.

An anticipation signal may be added quite simply, without extra equipment, in the embodiment of Figure 6 by arranging that when the motion is purely harmonic the acceleration signal from generator 7 is larger than that from potentiometer 29 by the amount required to provide anticipation. The magnitude of the difference depends upon the degree of anticipation required but it might, in a practical case, be of the order of 10 to 15%. With this arrangement, under conditions of purely harmonic motion, the stabilization control signal consists of the velocity signal from gyroscope 6 and an anticipatory acceleration signal from generator 7, through amplifier 8, which are added in synchro 9. When the motion departs from the harmonic characteristic the signal from amplifier 8 varies according to the change in the character of the roll.

Figure 7:
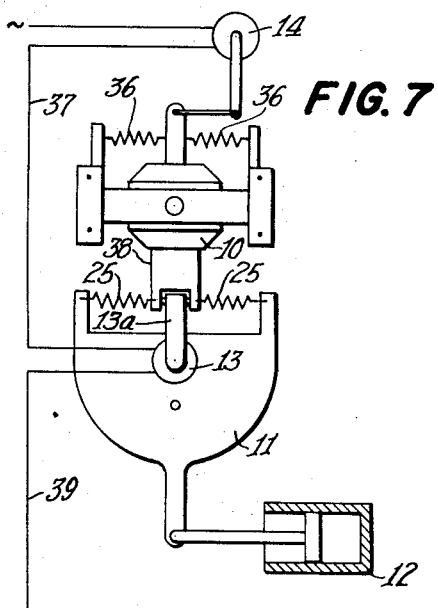
Figure 7 is an alternative embodiment.

Figure 7 shows a form of control alternative to the arrangement shown in Figure 6. A velocity sensitive gyroscope 10 is provided with restoring springs 36, as previously described, so that its movement corresponds to roll velocity and its rate of movement corresponds to roll acceleration. Its casing is mechanically coupled to a transmit synchro or magslip 14, which transmits an electrical signal in known manner over three leads represented by the line 37. An arm 38 attached to the casing of gyroscope 10 engages an arm 13a fixed to the rotor of a synchro differential or magslip follow-through transmitter 13. The stator of synchro 13 is secured to a lever 11 pivoted on the axis of synchro 13. Lever 11 is linked to arm 38 by springs 25. Lever 11 is also linked to the piston of dashpot 12 or an equivalent viscous or eddy current device in which the force developed is proportional to velocity, so that the relative movement between the rotor and stator of synchro 13 is proportional to roll acceleration. Leads 37 are connected to synchro 13 and output leads 39 connect synchro 13 to a further synchro differential or magslip follow-through transmitter 15.

A vertical keeping or pendulous gyroscope 16 is connected mechanically to an arm secured to the rotor of synchro 15. The mechanical lever ratios and the electrical connections between synchros 13 and 15 are such that when the roll is a simple harmonic motion their signals cancel and the output signal from leads 40 consists of the velocity signal from synchro 14 only. As soon as the motion departs from the harmonic characteristic a difference signal between synchros 13 and 15 is added to the velocity signal from synchro 14.

As in the case of Figure 6, an anticipation signal may be added by altering the mechanical lever ratios, for example, the length of arm 13a or the length of the arm attached to synchro 15, to procure that when the motion is a simple harmonic motion the signals from synchros 13 and 15 do not quite cancel and one of them predominates by the amount required to add the desired anticipation signal to the velocity signal from synchro 14.

Figure 8:
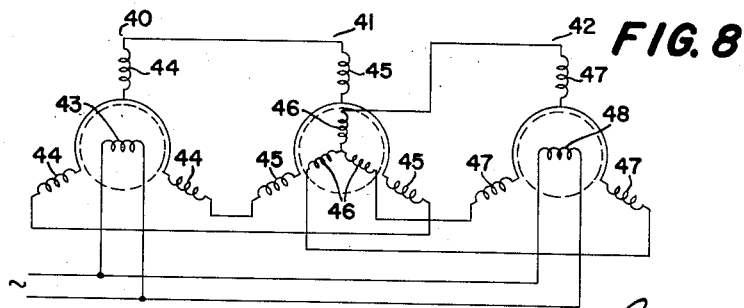
Figure 8 shows a simple synchro differential system.

Synchro differential and magslip follow-through systems are well-known. The simplest differential system is shown in Figure 8 in which element 40 is a transmit synchro, element 41 is the differential and element 42 is a transmit synchro which functions as receiver.

As shown in the figure, all three elements have stators with three equally spaced windings similar to those of a 3-phase induction motor. The rotors of elements 40 and 42 have single rotor windings which are energised from an A.C. supply whilst the rotor of element 41 has three equally spaced rotor windings.

An alternating magnetic field is set up by the rotor winding 43 of element 40 and this induces voltages in stator windings 44 by transformer action. The magnitudes of the individual voltages depend upon the angular positions of the stator windings with respect to the rotor and vary as the rotor is turned. The individual stator voltages are either in phase or anti-phase with the supply voltage, depending upon the angular position of the rotor. The three voltages are transmitted to windings 45 of differential element 41 where, by combination, they produce an alternating magnetic field which is in angular correspondence with the field in element 40. When rotor 43 is turned its magnetic field rotates with it and the magnetic field in element 41 also rotates and maintains an exactly corresponding angular position.

The alternating field in element 41 induces voltages in rotor windings 46 of element 41 which, in turn, cause currents to flow in stator windings 47 of receive element 42.

The energising winding 48 of element 42 sets up an alternating field and since the rotor of the receive element is free to move it is rotated into the position in which the axis of its field coincides with the axis of the stator field.

If the rotor of element 40 is rotated the stator field of element 41 is also rotated by a corresponding amount. The voltages induced in rotor windings 46 are varied and in consequence the stator field in element 42 is similarly rotated. The rotor of element 42 follows. If the rotor of element 41 is rotated then the relative magnitudes of the voltages induced in the three windings 46 are altered and the currents in windings 47 are correspondingly altered so that the stator field in element 42 is rotated by the same amount. Thus, depending upon the sense in which the mechanical movements are applied, and the electrical conections, the movement of the rotor of element 42 corresponds to the sum or difference of the mechanical movements applied to elements 40 and 41.

In the arrangement of Figure 7, two differential synchros (elements 13 and 15) are required and the second differential unit can be inserted in the connecting lines of Figure 8 either between elements 40 and 41 or between elements 41 and 42. The rotor of the receiving element will in that case take up a position corresponding to the sum or difference of the movements applied to the transmitter and the two differentials.

It is to be understood that the invention is not confined to the particular practical embodiments shown. By substituting other mechanical, electrical, hydraulic or mechanical devices for those shown, many different constructions are possible. These will readily occur to those skilled in the art and are within the scope of the invention which is defined in the appended claims.

I claim:

1. Control apparatus for stabilization of ships against tilting comprising a vertical keeping gyroscope, means coupled to said gyroscope to deliver an electrical signal corresponding to tilt angle, a velocity-sensitive gyroscope, means coupled thereto to deliver an electrical signal corresponding to tilt acceleration, means for adjusting said electrical signals to be of equal magnitude when said motion is a simple harmonic motion, an amplifier, means for connecting said signals in series opposition to the input terminals of said amplifier so that no signal appears at the output terminals of the amplifier when said motion is a simple harmonic motion but a difference signal appears when said motion departs from simple harmonic motion, an electro-mechanical device for adding and transmitting signals, means connecting said velocity-sensitive gyroscope mechanically thereto to produce a signal corresponding to tilt velocity, means for connecting the output of said amplifier to said electro-mechanical device whereby said tilt velocity signal and said difference signal are added to produce a control signal corresponding to the sum or difference of said tilt velocity signal and said difference signal.

2. Control apparatus for stabilization of ships as claimed in claim 1, in which the tilt acceleration component of the difference signal is made preponderant over the tilt component, the preponderance being of such magnitude as to provide a desired degree of anticipation.

References Cited in the file of this patent

UNITED STATES PATENTS

| 1,372,184 | Minorsky | Mar. 22, 1921 |
| 1,703,280 | Minorsky | Feb. 26, 1929 |
| 2,488,286 | Glenny | Nov. 15, 1949 |
| 2,550,220 | Bussei | Apr. 24, 1951 |
| 2,619,623 | Meredith | Nov. 25, 1952 |

FOREIGN PATENTS

| 425,034 | Great Britain | Mar. 4, 1935 |
| 453,744 | Great Britain | Sept. 17, 1936 |
| 581,776 | Great Britain | Oct. 24, 1946 |